June 1, 1965 W. G. RUNYAN 3,187,269
STATIC INVERTER SYSTEM
Filed Nov. 8, 1961 2 Sheets-Sheet 1
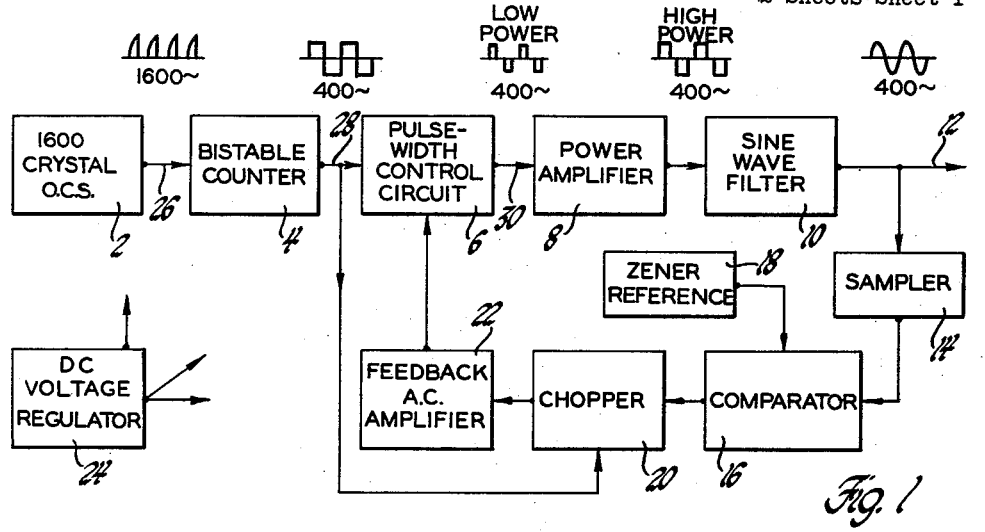
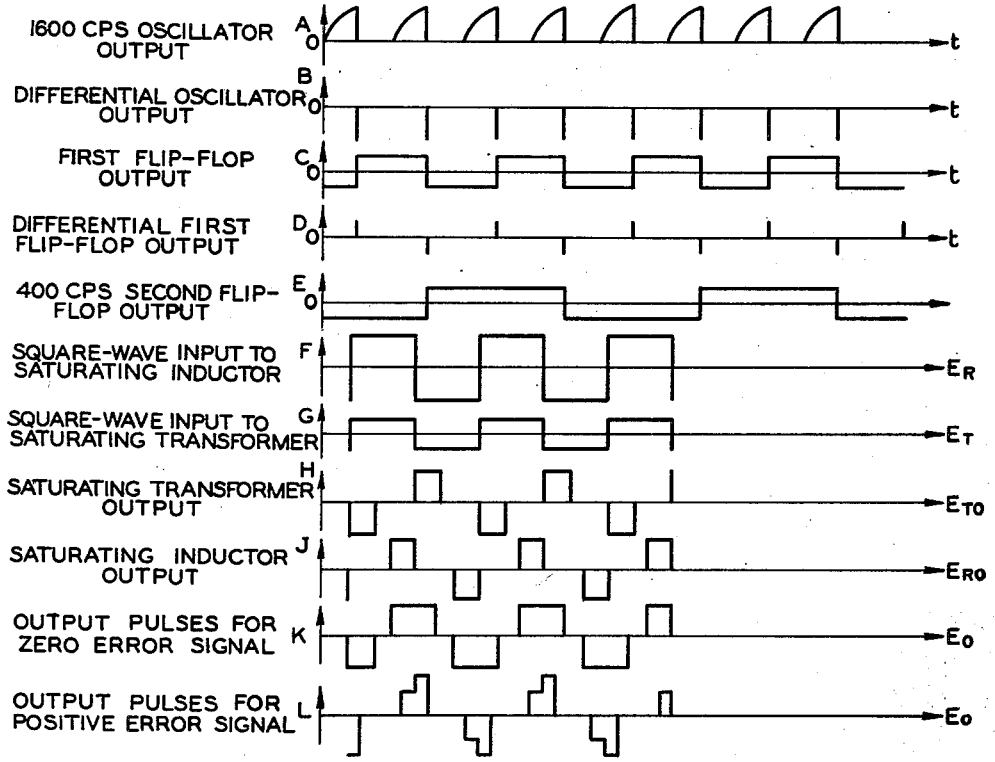
Fig. 2
INVENTOR.
Wesley G. Runyan
BY
Robert E. Fowler
ATTORNEY June 1, 1965

W. G. RUNYAN 3,187,269

STATIC INVERTER SYSTEM

Filed Nov. 8, 1961

INVENTOR.
Wesley G. Runyan
BY
Robert E. Fowler
ATTORNEY

# United States Patent Office 3,187,269
Patented June 1, 1965

3,187,269
STATIC INVERTER SYSTEM
Wesley G. Runyan, Marion, Iowa, assignor to General Motors Corporation, Detroit, Mich., a corporation of Delaware
Filed Nov. 8, 1961, Ser. No. 150,975
2 Claims. (Cl. 331—74)

This invention relates to static inverter means for converting low voltage direct current to higher voltage alternating current. For example, such equipment may be used to convert D.C. power of 25 to 30 volts to 400 cycle, 115 volt alternating current for aircraft or missile work. This is only exemplary and this construction could be used for any other specific voltages. Basically the system consists of a high frequency oscillator powered by a direct current source, the oscillator output of which is reduced in frequency to the desired system output frequency, then amplified, filtered and shaped to provide the proper power output. The system is also supplied with stabilizing feedback means which samples the output and applies a control voltage back to an intermediate portion to regulate or control the same.

It is, therefore, an object in making this invention to provide static inverter means of simple construction having no moving parts.

It is a further object in making this invention to provide a crystal controlled, stabilized, transistorized static inverter for providing A.C. power from a low voltage D.C. source of electrical power.

It is a further object in making this invention to provide a transistorized static inverter system incorporating a pulse width control circuit for regulation and means for amplifying the variable width pulses to produce a stabilized output.

With these and other objects in view which will become apparent as the specification proceeds, my invention will be best understood by reference to the following specification and claims and the illustrations in the accompanying drawings, in which:

FIGURE 1 is a block diagram showing the essential sections incorporated in the invention;

FIG. 2 is a series of graphs illustrating the various wave forms appearing at different locations in the system; and, FIG. 3 is a complete circuit diagram of a single phase transistorized static inverter system embodying the invention.

Referring now more particularly to FIG. 1, block 2 illustrates the fundamental crystal oscillator which in this instance illustratively generates waves of a frequency of 1600 cycles. This crystal oscillator feeds its output into a bi-stable counter section 4 for reducing the frequency to the desired system output frequency, in this case 400 cycles. The output of the bi-stable counter unit 4, therefore, is a series of square pulses at a 400 cycle rate. These are fed into a pulse width control circuit 6 which is provided for regulatory purposes, the width of each pulse being adjustable to vary the total output of the inverter without changing the phase of the pulses in relation to the rest of the system. After each pulse is passed through the pulse width control circuit 6 it is then applied to a power amplifier 8 for amplification and lastly through a sine wave filter 10 to change the wave form before being fed to the output line 12 where the 400 cycle A.C. sine wave output appears.

In order to regulate and provide a stabilized output, sample signal is taken from line 12 and fed to a sampler unit 14, thence to a comparing device 16 where its amplitude is compared with a standard value provided by a Zener reference 18 also connected to the comparator.

If the amplitude of the output wave on line 12 is less than the voltage of the Zener reference, a corrective voltage will be fed back to the pulse width control circuit 6 to increase the main output and if it exceeds the Zener reference voltage then the corrective voltage will tend to reduce the main output voltage. The error voltage or feedback from the comparator 16 appears as a D.C. voltage and is then fed to a chopper unit 20 to convert to A.C., and then amplified in an A.C. amplifier 22 and applied to the pulse width control circuit 6 previously mentioned. The value and polarity of this feedback voltage modulates the width of the pulses passing through section 6 and so regulates the value of the output voltage on line 12 to maintain the same substantially constant. The system, of course, is supplied with D.C. power which is not specifically shown in the block diagram, which power is fed through a D.C. voltage regulator unit 24 and applied to various parts of the circuit indicated by the plurality of arrows emanating from this block.

To diagrammatically illustrate the various wave forms appearing on different portions of the circuit in FIG. 1, there is shown above the connection 26 between the basic power oscillator 2 and the bi-stable counter 4 a series of waves indicating the shape of the 1600 cycle output of the oscillator. In like manner, above the connection 28 between the bi-stable counter 4 and the pulse width control circuit 6 there are shown a plurality of alternate square waves indicative of the 400 cycle output of that unit. In the pulse width control circuit 6 the square waves are modulated reducing the width of the pulses fed in and, therefore, the pulses appearing on the connection 30 between the pulse width control unit 6 and the power amplifier 8 are shown as being narrower in width than those fed in. The pulses appearing in the output of the power amplifier 8 and fed into the sine wave filter 10 are illustrated as being of greater width than those fed in since they have been amplified. Lastly, the final output voltage on line 12 is shown as a 400 cycle sine wave after passing through the filter.

Referring now specifically to FIG. 3, it is first desired to designate those parts of the specific circuitry which have been previously described in block diagram form. The crystal oscillator 2 is shown in the upper lefthand corner of this figure within the dashed outlines and directly below this is the bi-stable counter circuit 4. Next in descending order on the lefthand side of FIG. 3 and entirely enclosed by a dashed outline is the pulse width control circuit 6. The power amplifier shown in FIG. 1 at 8 is shown just to the right and again is completely enclosed in a dashed outline. Across the lower portion of FIG. 3 beginning at the left is the sampling circuit 14 enclosed in dashed outline. Next to the right is the feedback A.C. amplifier 22 and lastly between the feedback amplifier 22 and the power amplifier is the voltage regulator section 24. The comparator or error detection circuit 16 and the Zener reference 18 shown on FIG. 1 are in this case included in the area identified as the sampler so this unit is marked not only 14 but 16 and 18 as well. The sine wave filter circuit 10 appears on the righthand side of FIG. 3 and consists of the output of the final transformer.

Returning now to a more specific consideration of each of these sections, the crystal oscillator as shown in that area broadly identified as section 2 is essentially a relaxation oscillator which is free running even when the crystal is removed. There is, however, a crystal provided in the feedback path which controls the frequency of the oscillator. It is necessary to provide the free running oscillator with the crystal as at these low frequencies the oscillator does not start readily. This two stage oscillator consists of a control crystal 34 located in the collector circuit of a second stage transistor 36 in series with a resistance 38, one terminal of said crystal 34 being connected to the resistance 38 and the opposite side of the crystal being connected directly back to the base electrode 40 of a first stage transistor 42. A condenser 44 is connected in shunt across the crystal 34. The collector 46 of the first stage transistor 42 is capacitatively coupled through condenser 48 directly into the base 50 of the second stage transistor 36 and, therefore, provides a two-stage oscillator which is free running. Power is supplied to the collectors of both transistors through power line 52 which is connected through a resistance 56 with collector 58 of transistor 36 and through resistance 60 to collector 46 of transistor 42. Power is also supplied to the emitters of the two transistors through power line 68 which is directly connected to the emitters of both transistors. Biasing resistors 62 and 64 are connected between the collector and base electrodes of transistors 42 and 36, respectively. While the specific frequency can be of any desired value, 1600 cycles has been selected as illustrative and this frequency, therefore, appears on the output line 66 from this oscillator which is connected to collector 58 of transistor 36.

This line is capacitatively coupled through condenser 70 to the input of the first flip-flop section of the bi-stable counter at line 72. This specific bi-stable or flip-flop circuit is conventional and one-half conducts and remains conducting until the arrival of the next negative pulse at which time the other side of the system is then switched on to become conductive, turning off the first side. Thus, on the first negative pulse transistor 74 would conduct and transistor 76 remain non-conducting and upon the arrival of the next pulse transistor 74 would be cut off and transistor 76 become conducting. Thus, at the collector electrode 78 of this flip-flop section only every other pulse would appear, thus cutting the frequency of the input pulses in half. This is a normal and well known operation of a bi-stable or flip-flop circuit. This flip-flop circuit is supplied with power for the emitters from power line 68 through a biasing resistance 80 and the collectors are in like manner supplied with power from the power line 52 through biasing resistors 82 and 83. The output of this first bi-stable section, therefore, is a series of square wave pulses at one-half of the frequency of those fed into this section from the basic oscillator.

These pulses are fed into the second bi-stable unit since the collector electrode 78 of the transistor 76 is coupled through a capacity coupling including condenser 84 to the input of the second bi-stable unit including transistors 86 and 88. Power line 68 supplies the entire electrodes of these transistors with power through a biasing resistor 90 and the collector electrodes are supplied with power via a tie line 92 from power line 52 and biasing resistors 91 and 93. Again the pulses applied to this second bi-stable unit cause the transistors 86 and 88 to alternately conduct and the output frequency is cut in half as it appears on collector 94 of transistor 88. Since an original frequency of 1600 cycles was assumed and the first bi-stable unit divided this in two, the output frequency of the first bi-stable unit would be 800 cycles and passage through the second bi-stable unit or flip-flop would reduce the frequency to the desired output frequency of 400 cycles.

The 400 cycle output of the second bi-stable unit is applied directly to a single stage amplifier consisting of transistor 96 whose base electrode 98 is connected directly to collector electrode 94 of transistor 88. Emitter 100 of the transistor 96 is connected to power line 68 through a biasing resistor 102 and collector electrode 104 is directly connected to tie line 92 for its power supply. The output from this amplifier is taken off as an emitter follower circuit and the emitter electrode is connected through a condenser 106 to one terminal of the primary winding 108 of a coupling transformer 110, the other side of the primary winding being connected directly to the power line 68. Thus these amplified square wave pulses will be applied to the transformer 110.

This transformer is the first component in the pulse width control unit 6 and it has a pair of secondary windings 112 and 114. Winding 114 is center tapped and feeds a square wave inverter including transistors 116 and 118 whose base electrodes are connected to the outside terminals of the secondary winding 114. The center tap of the secondary winding 114 is connected through a resistance 120 to both emitter electrodes of transistors 116 and 118. The collector electrodes of transistors 116 and 118 are connected to the outside terminals of primary winding 122 of power transformer 124 feeding the main pulse width control section. Power line 92 is connected to a center tap 93 of primary winding 122 on this transformer. The second secondary winding 112 of transformer 110 is used to control the chopper section of the sampling and comparator phase and will be further described at a later point.

Power transformer 124 is provided with two secondary windings 126 and 128 and one additional primary winding 130, the latter being for feedback stabilizing purposes. Secondary 126 is a control winding used to supply biasing potential to the power amplifier and that winding also will be described more at a later point in relation to the power amplifier itself. Secondary winding 128 passes the main pulse train and is connected to the pulse width control circuit for regulatory purposes. One terminal of the secondary winding 128 is connected through two resistances 132 and 134 in series to the upper terminal of primary winding 136 of a saturating transformer 138. The lower terminal of primary winding 136 is directly connected back to a center tap 140 on secondary winding 128. The secondary winding 142 of the transformer 138 has its upper terminal connected directly to primary winding 144 of power transformer 146 and the lower end of the secondary winding 142 is connected through a resistance 148 to line 150. Line 150 extends from the lower terminal of secondary 128 to the lower terminal of primary 144 of power transformer 146. A resistance 152 is connected from the upper terminal of secondary 128 of transformer 124 to conductive line 154 and a reactance choke coil 156 is connected between line 154 and the lower terminal of secondary 142. A conductive line 155 has one end connected to a point between resistances 132 and 134 and extends to the feedback A.C. amplifier 22.

The corrective feedback signal is applied across lines 154–155 to the pulse width control circuit just described. In this circuit the main input signal $E_R$ 400 cycle square wave appears across the secondary winding 128. The error signal $E_E$ is also a square wave signal and appears across resistances 132 and 152. If the error signal $E_E$ is positive then it adds to the voltage across resistance 134 and primary winding 136 and subtracts from the voltage applied across the choke 156 and resistance 148. Thus a positive error signal causes the core of the saturating transformer 138 to saturate sooner and the choke 156 to saturate later. Thus the pulse would be narrower about the midpoint of the wave. If the error signal $E_E$ is negative the reverse takes place and the wave or pulse is widened to give larger output. This circuitry provides a means for modulating the width of the pulses depending upon the time for saturation of the transformer core and choke coil. The specific circuitry is the subject matter of a co-pending application Serial No. 109,321, filed May 11, 1961, in the name of Wesley G. Runyan, entitled "Static Inverter," and assigned to a common assignee. The output pulses applied to transformer 146 are centered around the 180° point of the input square wave by this system. By selecting the proper values the pulses do not phase shift from the 180° point but any increase or decrease in the output signal produces an error signal which widens or narrows the pulses about that point. Therefore, there is no phase shift.

The output of the transformer 146 appearing on secondary winding 158 thereof is applied to a clipping and coupling stage including transistors 168 and 174. This is accomplished by connecting the upper end of secondary winding 158 through diode 164 to base electrode 166 of the transistor 168 and in like manner connecting the lower end of the same winding through diode 170 to the base electrode 172 of transistor 174. The emitter electrodes of these transistors are connected together and to power line 68 for power and the collector electrodes of transistors 168 and 174 are connected to the upper and lower terminals, respectively, of the primary winding 160 of coupling transformer 162. A pair of resistances 176 and 178 are connected in series across the base electrodes 166 and 172. A further resistance 180 is connected from a center tap of secondary winding 158 to a point intermediate the resistance 176 and 178. The power line 68 is connected through conductor 182 to one terminal of resistance 184, a first diode 186, a second diode 188 and to one terminal of a condenser 190. The two diodes 186 and 188 are also connected to the top and bottom terminals of the primary coil 130. The midpoint between resistances 176 and 178 is connected to line 192. This line is connected to the remaining terminal of the condenser 190 and that of resistance 184. A final resistor 194 is connected from the last point to a center tap on the primary winding 130. These connections provide a negative cut-off voltage for the clipper stage by rectifying the square wave voltage of winding 130 and applying the same to the transistors 168 and 174.

The final output of this stage 6 is a series of square wave variable-width pulses which drive the power amplifier 8. These pulses are spaced so that there is a definite "Off" time between pulses which introduces problems in amplification. The power amplifier section 8, therefore, is one especially designed for the purpose. The power transformer 162 feeding the power amplifier is provided with two secondary windings 196 and 198 for parallel or tandem type operation one section of each half conducting simultaneously. Since the amplifier is required to handle a considerable amount of current a plurality of transistors in parallel are necessary in each conductive path. One terminal of secondary winding 196 is connected through line 198 and a series resistor 200 to the base electrode 202 of a first transistor 204. The collector electrode 206 of this transistor is connected through line 208 with tap 210 on a first primary winding 212 of power output transformer 214. The emitter electrode 216 of transistor 204 is connected directly to the base electrode 218 of a second transistor 220 whose collector electrode 222 is, in a similar manner, connected through line 224 to a tap 226 on the primary winding 212. Two additional transistors 228 and 230 connected in parallel complete this particular conductive path between transformer windings and both of their collector electrodes are commonly connected to line 232 which extends to the upper terminal of the primary winding 212. The base electrodes of these two transistors 228 and 230 are connected together and to the emitter electrode 234 of the transistor 220. The emitter electrodes of transistors 228 and 230 are connected together and to line 236 which provides a coupling back to the center tap of the secondary winding 196 through tie line 238. Thus any signal appearing across one-half of the secondary winding 196 appears as an input across the various emitter-base electrodes of the transistors 204, 220, 228 and 230 each of which assists in the control of the total current flow to the primary winding 212 of the final output transformer 214.

In like manner a second alternate conductive path is provided. The lower terminal of secondary winding 196 is connected through a biasing resistor 240 to the base electrode of a first transistor 242 controlling the flow through the same, which transistor is associated with three other transistors 244, 246 and 248 in a similar circuit arrangement to that described above. The emitter electrodes for the last two transistors 246 and 248 are connected to line 236 and thence through line 238 to the center tap of the secondary 196 as in the first instance. The collector electrodes of transistors 242, 244 and 246–248 are connected through conductors 250, 252 and 254, respectively, to taps 256 and 258 and to the lower end terminal of the primary 212. This circuitry constitutes one-half of the basic amplifier circuit, the two paths conducting alternately on plus and minus pulse input signals and when the signals appear on secondary 196 produces amplified signals on the primary winding 212.

This type of power amplifier or direct compound connection has the advantage of very high current gain but has the disadvantage of a high voltage drop when the transistors are saturated. Since one path is cut off or non-conducting when the other conducts, it is also desired to provide reverse biasing for positive cut off of the one-half which is non-conducting while the other half conducts which, in addition, reduces the saturation voltage drop. This reverse biasing is provided by a pair of diodes and a pair of resistors in series to form a potential divider connected across the direct compound amplifier connection. In the upper portion of the circuit this consists of a first diode 260 which is connected in shunt across resistance 200, a second diode 262 which is connected across the base-emitter electrodes of transistor 204, a resistance 264 which is connected across the base-emitter electrodes of transistor 220 and lastly a resistor 266 that is connected across the base-emitter electrodes of both resistors 228 and 230 since they are in parallel. This circuitry including the two diodes and two resistors provides proper biasing for the four transistors so that they will conduct a maximum amount of current for which they are designed during conductive periods and will also provide reverse leakage current to give a positive cut-off potential when this bank or path is in non-conducting condition so that in switching back and forth between the banks of transistors, including transistors 204, 220, 228 and 230 and those in the second bank, including transistors 242, 244, 246 and 248, one bank is turned fully on and the other bank turned completely off to provide maximum conduction and minimum leakage. To complete the bias circuitry the lower bank of transistors is provided with similar biasing and reverse cut-off means including a diode 268 connected in shunt to resistance 240, a second diode 270 connected between the base and emitter electrodes of transistor 242, a first resistor 272 connected between the base and emitter electrodes of transistor 244 and a second resistor 274 connected between the base and emitter electrodes of transistors 246 and 248. All of these elements are in addition connected in series relation to develop the proper biasing voltages for the operation of their associated transistors and provide the operating turn on and cut-off biases.

A tandem channel is provided between a second secondary winding 198 of the power coupling transformer 162 and a second primary winding 276 of transformer 214 and includes identical circuitry to that associated with the first channel, one path of said second channel being conductive with one path of the first and switching simultaneously to provide sufficient input power to the output transformer 214. The second channel is a duplicate of the first and without going into detail it is desired to point out that the upper terminal of secondary 198 is connected to the upper portion of the primary 276 through a first bank of transistors 278, 280, 282 and 284 and that the lower terminal of the secondary 198 is connected to the lower end of the primary 276 through a second bank of transistors including transistors 286, 288, 290 and 292. The associated biasing and connecting circuitry in this instance is identical to that described specifically with regard to the first upper channel and will not be gone into in detail. When the upper path through transistors 204, 220, 228 and 230 is conducting, the path through the second channel upper portion including transistors 278, 280, 282 and 284 is also conducting and when the system switches to cut off the upper path in the top channel and open the path through the lower group the same occurs in the lower channel. The two sets switch simultaneously.

As before mentioned, the waves which this section is called upon to amplify are alternate plus and minus square waves which are separated by finite intervals of zero voltage. This introduces a problem in providing a positive means for cutting off the switching transistors during "zero time" which means in this case that time during which the voltage is zero. If some positive means are not provided to bias the transistors off a high leakage current will result and consequently high collector dissipation. Specific means are, therefore, provided for zero time cut off and this means includes the following components, diodes 294, 296, 298 and 300 together with transistor 302. Diode 294 is connected directly between the upper terminal of the secondary winding 196 and the base electrode of transistor 302 and diode 298, in like manner, is connected between the lower terminal of secondary winding 196 and the base electrode of transistor 302. Diode 296 is connected between the collector electrode 304 of the transistor 302 and a point intermediate the two biasing diodes 260 and 276 of the upper transistor switch path or bank. Lastly, diode 300 is connected between the collector electrode 304 and a point intermediate the two diodes 268 and 270 of the lower switch bank. A resistor 306 is connected between the base electrode 308 of the transistor 302 and the center tap of the secondary winding 196.

Drive voltage on either half of the secondary winding 196 is regulated to 12 volts peak. During the time that plus or minus pulses appear this 12 volts is applied across the resistance 306 to bias the same with the upper end plus. The emitter 310 of the transistor 302 is maintained at a +9 volts with respect to the center tap of the secondary 196 by being connected through two rectifiers 312 and 314 and their associated lines 316 and 318 to the opposite ends of secondary winding 126 on the transformer 124. The emitter 310 is coupled to the line 236 through a small condenser 320. Therefore, during periods when either a plus or minus pulse is present +12 volts is applied to the base of the transistor 302 and +9 volts appears on the emitter and during this time this transistor 302 is non-conducting or off. However, during zero time or that time at which no plus or minus pulse is present this transistor conducts due to the presence of the +9 volts on the emitter and the absence of the 12 volts on the base. With this transistor switch on, the input bases of all of the transistors in both the upper and lower banks of the upper channel have +9 volts positive with respect to their emitters applied thereto holding both sets of transistorized switches off. The circuit by which such 9 volts positive is applied to any one of the bases may be illustrated as that applied to the base of transistor 204, starting with emitter 310 which has been described as having 9 volts positive applied thereto at all times through the body of the transistor, the collector 304, diode 296 directly to the base 202 of the transistor 204. Similar circuits can be traced to the bases of the other transistors in the upper bank including transistors 220, 228 and 230 as well as their counterparts in the lower bank including transistors 242, 244, 246 and 248. By the use of this circuit the transistors are held positively non-conducting during the off times to prevent leakage.

The holding of the switches off or open during zero time, however, produces other difficulties. First, at the beginning of zero time the output transformer 214 has a net magnetic field. Since all switches are open the current generated by the collapse of the magnetic fields of this transformer must flow through the load. Second, at reduced loads the amplitude and duration of transient voltages existing on the transformer during this zero time make output regulation most difficult. Third, looking back into the amplifier from the input of the output filter the amplifier output impedance becomes extremely high during the zero time period. This condition causes distortion of the output wave form due to the inability of the tuned circuit in the filter to resonate properly. In order to overcome these problems it is necessary to short out the primary winding 212 during zero time and this will correct the difficulties. The portion of the circuit provided for shorting consists of a plurality of diodes and transistor switches including the following: diodes 322, 324 and transistor 326 associated with the secondary winding 198 of the transformer 162 and a group of transistors connected in parallel including transistors 328, 330 and 332 forming a single switching means together with a condenser 334 and four associated diodes 336, 338, 340 and 342. This last group of components are associated with the primary winding 212.

The diode 322 is connected between the upper terminal of the secondary winding 198 and the base electrode of transistor 326 through series resistance 344. In like manner the diode 324 is connected through resistor 344 with the base electrode of the transistor 326. Since the secondary winding 198 is center tapped and connected through line 346 with power line 348 a bias of −12 volts is applied to the base of the transistor 326 under certain conditions. The emitter electrode 350 of the transistor 326 is connected through Zener diode 352 with said power source and maintains a −6.8 volt bias on the emitter at all times. A resistor 354 has one terminal connected to the emitter 350 and the other terminal connected to a conductive line 356 and to tie line 358 which is connected to the negative input power supply line. The collectors of transistors 328, 330 and 332 forming a compound switch for shorting primary 212 are connected commonly together and to line 360 which extends between diodes 336 and 338. The remaining terminals of these two diodes are connected to the outside terminals of the transformer primary 212. Conductive line 362 extends from the collector electrode of transistor 326 directly to the base electrode of transistor 328. Diode 342 has one terminal connected to a tap on the primary winding 212 and another terminal connected through two resistances 364 and 366 in series to the base electrode of transistor 328. Conductor 356 is connected directly to the emitter electrode of transistor 332 and to a tap 368 on the primary winding 212. Diode 340 has one terminal connected to a tap on the primary winding 212 and its other terminal connected directly to the diode 342. Biasing resistances 370, 372 and 374 are connected in series between lines 356 and 362 to provide the proper bias for the emitter electrodes of the transistors 330 and 328.

In the operation of this portion of the system for shorting out a portion of the primary winding during zero time, the condenser 334 is charged through diodes 342 and 340 to approximately six volts during either plus or minus pulse time. At the same time, that is during either plus or minus pulse time, the base circuit of transistor 326 has a −12 volts bias applied thereto from the secondary winding 198 turning this transistor switch on. With this switch on the input to the base circuit of transistor 328 is at a −6.8 volt value since that is the voltage maintained on the transistor emitter 350 by Zener diode 352. This voltage maintains transistor 328 and its associated series transistors 330 and 332 off. With the arrival of a zero time in the wave train the base circuit of transistor 326 goes from −12 volts to zero and, therefore, this transistor switch turns off removing the −6.8 volts from the base electrode of the transistor 328. This transistor switch has been off but is turned on now by the discharge of condenser 334 through the forward direction of the emitter-base diodes of the transistors 332, 330 and 328. This causes this compound switch to turn on. With switch 328, 330 and 332 on, the transformer primary 212 will be shorted from either external lead 232 or 254 to the center tap 368 depending upon the polarity of the potential of the output transformer. It is to be noted that both the means for switching the two conductive paths through one channel on and off provided by the switching transistor 302 and its associated circuitry and the circuits for shorting out a portion of the primary winding of transformer 214 for reasons that have been pointed out controlled by transistor switches 328–330–332 apply only to the upper channel as it is found unnecessary to apply it to the lower channel.

The final output of the transformer 214 appears on the secondary winding 376 as an amplified pulse square wave having zero time periods. This is merely applied to the sine wave filter section 10 to change it into a sine wave form. This filter consists of a series LC circuit followed by a parallel LC circuit. Both sections are tuned to 400 cycles. The first LC circuit includes a condenser 378 in series with a choke coil 380 one terminal of which is connected to the upper terminal of the secondary winding 376 and the other through line 382 to one of the output terminals 384. The parallel LC tuned circuit consists of a condenser 386 which is connected between the lower terminal of the secondary winding 376 and line 382. The lower terminal of the secondary winding 376 is likewise connected directly to second output terminal 388. Inductance 390 is connected in parallel to condenser 386 and forms the parallel LC tuned circuit. The final output therefor appearing across terminals 384 and 388 is a 400 cycle sine wave.

A pair of conductors 392 and 394 extend from the output terminals 384 and 388 back to the sampling and comparator section for regulating purposes. These two conductors are connected directly to the opposite terminals of the primary winding 396 of transformer 398 and develop a signal therein whose amplitude is proportional to the output voltage. This transformer is located in the combination sampling, comparator and Zener reference unit included in the square identified by the numbers 14, 16 and 18. The A.C. sample of the 115 volt output voltage is applied to the secondary winding 400 of the transformer 398 and is then rectified and filtered in an LC section. The specific circuitry for this purpose includes a first diode 402, one terminal of which is connected to the lefthand side of the secondary winding 400, the opposite terminal being connected through two resistances 404 and 406 in series to a main power line 408. The righthand terminal of the transformer secondary 400 is connected through a second diode 410 to a point intermediate the first diode 402 and the resistance 404. The secondary winding 400 is center tapped and connected directly to the power line 408. Thus a rectified D.C. voltage whose value is proportional to the output voltage appears across resistor 406.

Adjustable tap 412 moves over the resistor 406 so that any desired amount of the voltage thereon can be taken off for regulatory purposes. This adjustable tap is connected through a choke coil 414 to one terminal of each of a pair of condensers 416 and 418 to complete a ripple filter for the feedback voltage. The output of the filter is connected to a diode 420 and to the emitter electrode 435 of chopper transistor 428. A Zener diode 426 is connected between the emitter electrode 422 and the power line 408 to provide a standard voltage with which the direct current feedback voltage after passing through the filter is compared, and this standard voltage is applied to the emitter 422. The two transistors 424 and 428 are used as a chopper to now chop up the D.C. error signal and apply a square wave error signal after amplification to the pulse width control section. The chopper is provided with 400 cycle current from the secondary coil 112 of the transformer 110. The outside terminals of the secondary 112 are connected through conductors 430 and 432 to the base electrodes of transistors 424 and 428, respectively. They, therefore, turn these two transistors on and off at a 400 cycle rate, the corrective signal being injected by the emitters of these two transistors. The emitter of the transistor 428 is connected through line 434 with a point intermediate diode 420 and choke 414 for its input signal. The collector electrodes of the transistors 424 and 428 are commonly connected together and through a biasing resistance 436 and line 438 are connected to a center tap on the secondary winding 112. The output of the chopper is a square wave A.C. pulse whose amplitude depends upon the amount of error and this appears upon line 440 and is applied through coupling condenser 442 to the input of the A.C. feedback amplifier in section 22.

The A.C. feedback amplifier in section 22 is a three-stage amplifier and since the D.C. error voltage is chopped and converted to A.C. before any amplification, D.C. amplifier drift is avoided. The loop gain of this three-stage amplifier is relatively high and it provides good inverter output voltage regulation. Specifically the amplifier consists of a first transistor 444 whose base electrode is connected directly to coupling condenser 442 to which the input signal is applied. Its collector electrode 446 is capacitatively coupled to the base of a second transistor 448 through a condenser coupling 450. In like manner the collector electrode 452 of transistor 448 is directly connected to the base electrode of a last stage transistor 454. The output from the last stage is taken from the emitter electrode 456 through a coupling condenser 458 and applied to line 155 previously mentioned which extends up to the pulse width control circuit. The appropriate supply voltages for these transistors are applied through power lines 408 and 460.

In order to properly supply regulated voltages to the various parts of the apparatus a voltage regulator section 24 is provided. Across two input terminals 462 and 464 there is applied the main D.C. power which may, for example, be a supply having 25 to 29 volts. Terminal 462 is connected to power line 408 and applies power to that line. The regulated section is adapted to provide regulated power of two different values to two lines, namely line 466 which extends from a first regulatory section to power lines 52 and 92 and a second tie line 468 which is connected to power line 460. As exemplary of the voltages which might appear on these two lines, 466 might carry +15 volts and line 460 +20 volts. Line 408 is connected through a Zener diode 470 and a resistor 472 in series therewith to power line 348 which in turn is connected to the other terminal 464. Thus a certain regulated voltage is applied to the emitter electrode of the transistor 474 from a point intermediate the Zener diode 470 and resistance 472. A resistance 476 is connected in series with the collector electrode of the transistor 474 and power line 348 for a proper bias. A second transistor 480 has its base connected directly to the collector of transistor 474, its collector connected through a biasing resistor 482 to the power line 348 and its emitter connected through a further resistor 484 with the power line 408. A variable tap 486 movable over the resistor 484 is directly connected to the base electrode of the transistor 474. This section applies a regulated voltage to the line 466 from the power supply whose value is determined by the setting of the variable tap 486. Since different values of voltage are necessary, a second section whose construction is identical with the first including two transistors 488 and 490 are connected between the power lines 408 and 348 to apply a different value of regulated voltage to line 468.

With the terminals 462 and 464 connected to a suitable source of D.C. power the oscillator 2 begins to oscillate delivering to its output a 1600 cycle wave having the shape shown as graph A in FIG. 2. This output appears on line 72 at point A on FIG. 3. At each negative going pulse of the oscillator output as shown by graph B of FIG. 2 the first flip-flop section including transistors 74–76 is actuated producing a square wave output from the first flip-flop section as shown at graph C, FIG. 2 and this wave would be at one-half the frequency of the original oscillator and appear on collector 78 at point C on the circuit in FIG. 3. In this case the frequency would be 800 cycles. The differential of the first flip-flop output is shown in the graph D, FIG. 2 and it is noted that this differential now includes negative going pulses spaced twice the distance apart of those on graph B and these negative pulses now actuate the second flip-flop circuit to produce again one-half frequency square waves such as shown on the graph E, FIG. 2 which appear on collector 94 of transistor 83 in the circuit FIG. 3 at location E. There is now produced on this line the desired 400 cycle frequency of the illustration.

This square wave is amplified and fed into the pulse width control circuit. The various voltages $E_R$, $E_T$, $E_{TO}$, and $E_{RO}$ appearing both on the graphs in FIG. 2 at F, G, H and J are found on the circuit FIG. 3 across the points identified by the same letters. This illustrates how the waves as applied to the saturating inductor 156 and saturating transformer 138 are modified to produce a square wave output, which, when combined, provide total signals such as shown at K on FIG. 2 as variable width pulses. Graph K shows the signal when no error signal has been induced to cause a modification in the width of the signal for regulatory purposes but in graph L in FIG. 2 an illustration of the effect of an error signal is included to show the narrowing of the pulse due to a demand for regulation. The variable width pulses, therefore, which from a practical standpoint do not actually change much in width but only slightly for normal regulation, are amplified in the power amplifier section 8 and applied to the series-parallel filter to convert them to sine wave form and the output finally appearing on the terminals 384 and 388 is a 400 cycle sine wave.

From the output an error or corrective signal is developed on lines 392 and 394 to regulate the same which is fed back to transformer 398 and rectified and converted to a D.C. signal whose amplitude is proportional to the amount of correction necessary to maintain a constant voltage output and compared with a standard produced by the Zener diode 426. If there is a difference voltage which is proportional to the error it is applied to the chopper 428–424 and converted to A.C. and then applied as an alternating square wave current to the A.C. amplifier 22 for amplification. The amplified error signal is finally applied through lines 154 and 155 to the pulse width control regulatory circuit for regulation. The diode 420 in the series circuit in the chopper is only included for starting purposes and once the system is in operation it is not needed.

I have thus provided a simple inverter for converting direct to alternating curent having no moving parts which is completely transistorized and produces a regulated output supply.

What is claimed is:

1. In static inverter means, generating means for developing square wave alternating current pulses of a desired output frequency, modifying means connected to the output of the generating means including a plurality of saturating reactor means through which the pulses flow to change their overall width for regulating purposes, a power amplifier connected to the modifying means to amplify the variable width alternating current pulses, filter means connected to the power amplifier and converting the square wave output to a sine wave train, a source of standard D.C. voltage, a feedback circuit connected to the output of the filter circuit, rectifier means connected to the feedback circuit and to the standard D.C. voltage providing direct current voltage proportional to the variation of the voltage on the final output line compared to the standard voltage resulting in an error D.C. voltage representative of the difference between the two, chopping means to which the rectifier means is connected and the error signal is fed connected to the generating means and driven at the same frequency to convert the D.C. error signal into A.C. of the output signal frequency and means interconnecting the output of the chopping means to the saturating reactor means in the modifying means to alter the width of the alternating current pulses as they are transmitted through that section for regulatory purposes.

2. In static inverter means, a source of electrical power, oscillatory means connected thereto to generate an alternating current wave of a desired output frequency, modifying means including reactor means connected to the oscillatory means for regulating purposes, amplifying means connected to the modifying means to amplify the waves, a main output circuit connected to the amplifying means to deliver alternating current power to a desired load, a standard voltage source connected to the source of electrical power and providing a voltage equivalent to the desired voltage on the main output circuit, a feedback circuit connected to the main output circuit and to the standard voltage source to compare the two voltages and develop a difference or error voltage if the output voltage differs from the standard voltage, rectifying means connected to the feedback circuit to rectify the error voltage and convert it into D.C. voltage, a chopper circuit having an input and an output circuit said input circuit being connected to the rectifying means connected to the feedback circuit and to the oscillatory means to drive the chopper means at the oscillator frequency and break up the D.C. error signal into A.C. of that frequency, a second amplifying means connected to the output circuit of the chopper means and to reactor means in the modifying means to regulate the waves passing therethrough to maintain a constant output on the main ouput circuit.

References Cited by the Examiner

UNITED STATES PATENTS

| | | | |
|---|---|---|---|
| 2,728,858 | 12/55 | Ziffer | 331—183 |
| 2,783,380 | 2/57 | Bonn | 331—36 |
| 2,987,664 | 6/61 | Poirier et al. | 331—113 |

ROY LAKE, *Primary Examiner.*